J. SLATTERY.
CAR WHEEL AND PROCESS OF MAKING THE SAME.
APPLICATION FILED JAN. 20, 1909.
925,394.
Patented June 15, 1909.
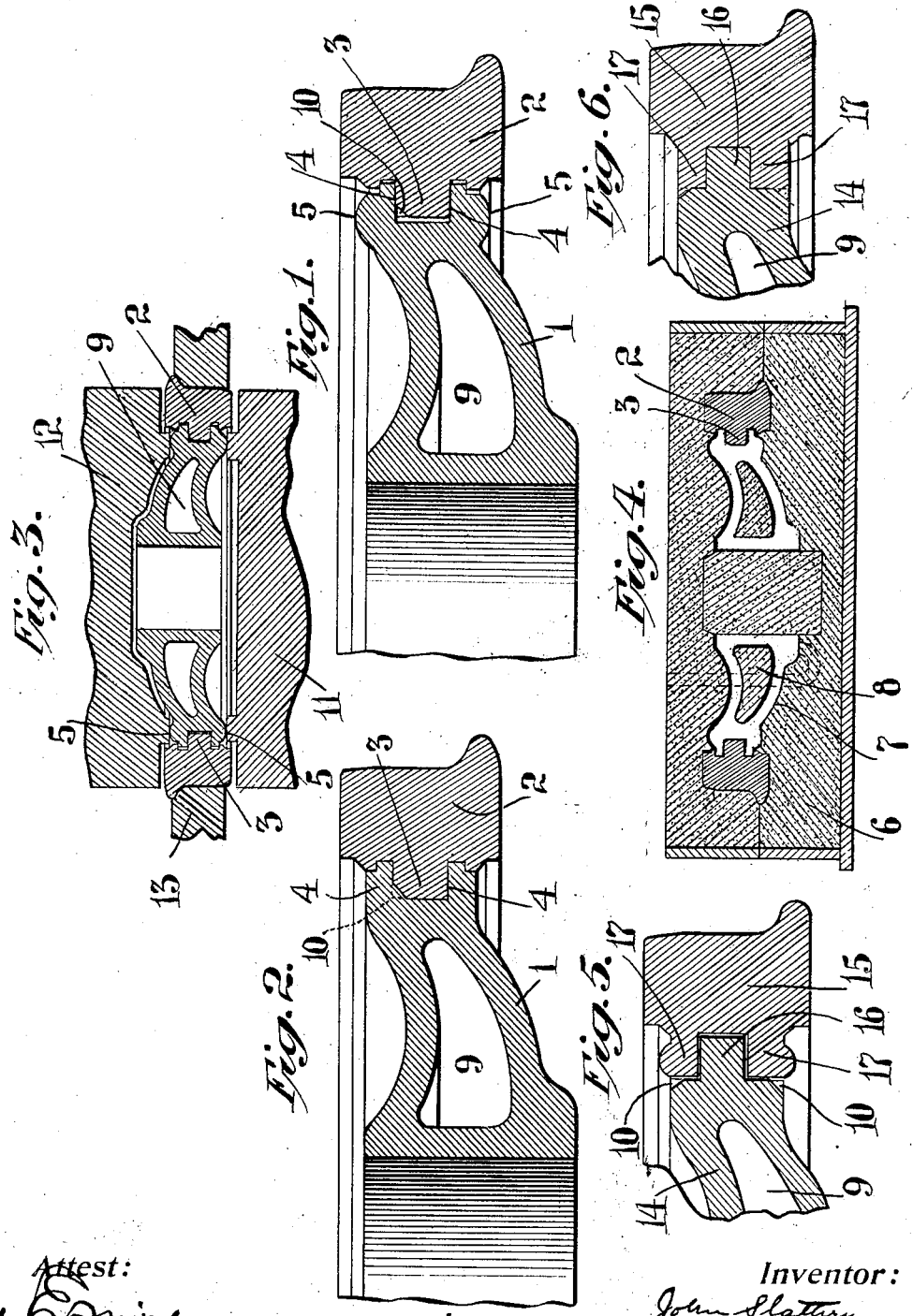
Attest:
Inventor:
John Slattery
Attys

UNITED STATES PATENT OFFICE.

JOHN SLATTERY, OF CHROME, NEW JERSEY, ASSIGNOR TO CANDA BROTHERS, OF NEW YORK, N. Y., A COPARTNERSHIP.

CAR-WHEEL AND PROCESS OF MAKING THE SAME.

No. 925,394.  Specification of Letters Patent.  Patented June 15, 1909.

Application filed January 20, 1909. Serial No. 473,266.

*To all whom it may concern:*

Be it known that I, JOHN SLATTERY, a citizen of the United States of America, and a resident of Chrome, county of Middlesex, and State of New Jersey, have invented certain new and useful Car-Wheels and Processes of Making the Same, of which the following is a specification.

My invention relates to car wheels and like metal wheels comprising two annularly related members secured together, and to a process of making the same, and my invention comprises a wheel comprising two annularly related members secured together by means of an integral annular rib on one said member fitting between two integral ribs of the other said member, and to a process or method of making such wheels, comprising the placing of one of said members in a mold and the casting of the other of said members in such mold, and the pressing of the resulting wheel so as to bring the two members of the wheel into close engagement.

The objects of my invention are, to provide a simple, strong and reliable wheel, such as specified, comprising annularly related members united together, and, preferably, formed of materials of different degrees of hardness, and to so design this wheel that it may be constructed at relatively little expense, and to provide a process of making such wheel capable of being carried out expeditiously and with relatively little expense, and, in particular, with relatively little machining of the parts.

It is very important that the tire or tread of a car wheel shall be of a very hard and tough steel. A tire of such material not only has greater inherent endurance than the best chilled cast iron, or than softer steel, but has far greater capacity to resist the formation of "flat spots", and so does not require truing as frequently as does the chilled iron or soft steel tread. Flat spots on the treads of car wheels are usually due to slipping of the wheel on the track after the application of the brake, and necessitate the removal of the wheel from the car and its truing up by grinding or turning down the tread of the wheel. Not only does this truing remove a considerable proportion of the material of the wheel rim, so reducing correspondingly the permissible mileage of the wheel, but it necessitates laying up the car for a considerable period of time, and considerable expense in machining and grinding; the total expenses from these causes and from the decreased mileage of the wheel being very considerable. Where a wheel is formed entirely from one grade of steel, as for example, in the case of an ordinary forged or pressed steel wheel, it is impracticable to have the rim or tread of the wheel materially harder than the material of the hub of the wheel, because the hub of the wheel must be of metal soft enough to permit the hub to be bored for the reception of the axle, and also because a relatively soft grade of steel must be used to permit the extreme alteration of section involved in converting an ingot or billet into a forged or pressed car wheel.

My invention overcomes these objections; permitting the hub portion and wheel body to be made of one grade of metal, either steel, or any other suitable material, and the tire to be made of a very hard and tough grade of steel, and these two members of the wheel when assembled, are united in such manner that they become thereafter practically one. Making the tire and the wheel body of different grades of metal has the further advantage that a steel best adapted, by reason of its hardness and toughness, for use in the wheel tire is expensive, and the cost of the wheel may be materially reduced by using a less expensive grade of steel for the wheel body and hub, this part of the wheel not requiring extreme hardness and toughness.

In the accompanying drawings I illustrate a car wheel embodying my invention, and the method of making the same.

In the said drawings: Figure 1 shows a fragmentary axial section of one form of my car wheel, before the parts have been pressed together; Fig. 2 shows a similar section of the wheel after the pressing operation; Fig. 3 is a view indicating more or less diagrammatically, the manner of performing the pressing operation, showing in section portions of the pressing dies and showing the wheel between said dies; Fig. 4 shows a longitudinal section of a mold such as may be used in forming the wheel, with the tire and cores in place therein; Fig. 5 shows a fragmentary axial section of another form of my car wheel, before the parts have been pressed together; and Fig. 6 shows a similar section of the wheel after the pressing operation.

In the drawings, numeral 1 designates a wheel body of any suitable form, and numeral 2 the tire which in this case is shown as a flanged tire such as car wheels are customarily provided with. The metals of these two parts are preferably of different grades, the tire being preferably of a hard and very tough steel, while the wheel body 1 may be of much softer steel. Furthermore, the tire is preferably a rolled tire, whereas the wheel body 1 is a casting. Said tire is provided, on its inner side, with an inwardly-extending rib 3, and the wheel body 1 is provided with corresponding outwardly projecting ribs 4 adapted to embrace this rib 3. Owing to the fact that it is commercially impracticable in the rolling of tires, to produce, by the rolling operation, a large number of tires, of about the same external diameter, having precisely the same internal diameter and ribs of precisely the same depth, and also because molds customarily differ slightly in size, for reasons well known to molders, I do not attempt in the casting operation to secure tight fitting together of the ribs 3 and 4 of the tire and wheel body respectively, but to the contrary cast the wheel body against the rib of the tire in such manner that greater or smaller clearance spaces are left, as indicated in Fig. 1, and I further provide the wheel body, as cast, with protuberant annular ribs 5. I then place the wheel body and tire between the dies of a suitable press and by the action of the said dies, exerted on these protuberant ribs 5, the wheel body and tire being then at a forging heat, press the engaging ribs together so that the clearance spaces referred to are completely closed and the parts of the wheel are firmly and inseparably united. Fig. 2 shows the resulting wheel.

Fig. 4 indicates the shape of the mold used and shows the tire in place within the mold, preparatory to the casting of the wheel body against it; 6 designating the body of the mold, 7 the space within which the molten metal to form the wheel body is to be poured, and 8 a core to form the cored-out space 9 of the wheel body.

To prevent relative rotation of the tire and wheel body, I customarily provide the rib 3 of the tire with a plurality of notches 10, at intervals, which notches will be filled by the metal of the wheel body when the ribs of said wheel body are pressed between the dies, as above described; the wheel body and tire being thereby firmly interlocked against relative rotation.

In pressing the wheel body against the tire, I customarily provide dies substantially such as shown in Fig. 3, wherein 11 designates a lower die upon which the wheel body rests, 12 an upper die by which the pressure is exerted, and 13 an annular die embracing the tire and serving to prevent distortion or spreading thereof during the pressing operation. In practice this die 13 will be provided with means such as well known to those skilled in the art, for accommodating the die to tires differing slightly in shape or external diameter.

The complete operation of making the car wheel is, therefore, as follows: The tire is rolled in the customary manner and is then placed within a mold such as shown in Fig. 4, and molten metal to form the body of the wheel is poured into this mold, thereby producing a wheel body having ribs 4 embracing the rib 3 of the tire. The parts so interlocked are then heated to a forging heat, after which they are placed between the dies of a suitable press and the wheel body is pressed against the tire so as to bring the metal of the two parts of the wheel into absolute contact at all points, to fill the notches 10, and, in a word, to make the two parts of the wheel practically one. Or, instead of using a press to force the two parts of the wheel together, I may use any other suitable means.

Instead of providing the wheel body with two ribs, and the tire with but one rib, the wheel body may be provided with one rib embraced by two ribs formed on the tire. This is illustrated in Figs. 5 and 6, in which 14 designates the wheel body, 15 the tire, 16 a single annular rib formed on the wheel body, and 17 two inwardly projecting ribs formed on the tire and embracing between them the single rib of the wheel body.

What I claim is:—

1. A method of forming car wheels and like objects, comprising two annularly-related members, which comprises forming one of said members with a rib or ribs adapted to be engaged by a rib or ribs of the other member, casting into approximate final relative position the other of said members and by the casting operation forming on the member so cast a rib or ribs interlocked with the rib or ribs of said other member, and by pressure forcing the engaging ribs of the two members together.

2. A method of forming car wheels and like objects, comprising two annularly-related members, which comprises forming one of said members with a rib or ribs adapted to be engaged by a rib or ribs of the other member, casting into approximate final relative position the other of said members and by the casting operation forming on the member so cast a rib or ribs interlocked with the rib or ribs of the said other member, the rib or ribs of one of said members being provided with surplus metal, and by pressure forcing the engaged ribs of the two members together and filling clearance space which may therefore have existed between the interlocked ribs of said members.

3. A method of forming car wheel and like objects comprising two annularly-related members, which comprises forming a tire with one or more inwardly projecting ribs, casting into approximate final relative position a body portion and by the casting operation forming on such body portion a rib or ribs interlocked with the rib or ribs of the tire, and by pressure forcing the engaged ribs of the two members together.

4. A method of forming car wheels and like objects comprising two annularly-related members, which comprises forming a tire with one or more inwardly projecting ribs, casting into approximate final relative position a body portion and by the casting operation forming on such body portion a rib or ribs interlocked with the rib or ribs of the tire, the rib or ribs of one of the members so formed being provided with surplus metal, and by pressure forcing the engaged ribs of the two members together and filling clearance space which may theretofore have existed between the interlocked ribs of said members.

5. A method of forming car wheels and like objects comprising two annularly-related members, which comprises casting into approximately correct relative position with respect to one of said members, previously formed, the other of said members, and then by pressure exerted against one of said members, while it is at a forging heat, uniting the members together.

6. A wheel comprising separately formed annularly-related members, provided with interlocked annular ribs, one of the said members provided with one such rib and the other of said members provided with two such ribs inclosing between them the first-mentioned ribs, one of said members having notches into which the metal of the other such member projects, thereby securing the members against relative rotation.

7. A wheel comprising a tire and a body separately formed, said tire provided with an inwardly projecting rib and said wheel body provided with two outwardly projecting ribs, embracing between them the rib of the tire, one of said members having notches into which the metal of the other such member projects, thereby securing the members against relative rotation.

In testimony whereof I have signed this specification in the presence of two subscribing witnesses.

JOHN SLATTERY.

Witnesses:
H. M. MARBLE,
FRANK E. RAFFMAN.